US011572237B2

(12) United States Patent
Mutarelli et al.

(10) Patent No.: US 11,572,237 B2
(45) Date of Patent: Feb. 7, 2023

(54) DEPALLETIZATION SYSTEMS AND METHODS

(71) Applicant: Target Brands, Inc., Minneapolis, MN (US)

(72) Inventors: Gervasio Mutarelli, Minneapolis, MN (US); David Sellner, Minneapolis, MN (US); Gregory Lisso, Minneapolis, MN (US); Ernesto Saldana Pena, Minneapolis, MN (US); Trevor Stratmann, Minneapolis, MN (US); Shefali Pai, Minneapolis, MN (US); Jamison Harrell-Latham, Minneapolis, MN (US); Justin Feider, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 17/495,589

(22) Filed: Oct. 6, 2021

(65) Prior Publication Data
US 2022/0106134 A1 Apr. 7, 2022

Related U.S. Application Data

(60) Provisional application No. 63/088,374, filed on Oct. 6, 2020.

(51) Int. Cl.
*B65G 59/02* (2006.01)
*B65G 69/26* (2006.01)

(52) U.S. Cl.
CPC ........... *B65G 59/026* (2013.01); *B65G 69/26* (2013.01); *B65G 2203/0283* (2013.01)

(58) Field of Classification Search
CPC ........ B65G 2203/0233; B65G 2203/04; B65G 2203/041; B65G 2203/042;
(Continued)

(56) References Cited

U.S. PATENT DOCUMENTS 4,723,884 A * 2/1988 Brinker ................ B65H 67/067
294/93
5,882,174 A * 3/1999 Woerner ................ B65G 65/00
414/795.8
(Continued)

OTHER PUBLICATIONS

Ferro Tiger [online], "Slim Lift Rotary Table—Ferro Tiger Mysore—www.ferrotiger.com," Posted Sep. 26, 2017, retrieved on Oct. 5, 2021, <https://www.youtube.com/watch?v=LtrvLSdvqng>, 2 page [Video Submission].
(Continued)

*Primary Examiner* — Gregory W Adams
(74) *Attorney, Agent, or Firm* — Fish & Richardson P.C.

(57) ABSTRACT

Warehouse automation and methods of handling materials can be used to enhance the safety and efficiencies of warehouse operations. For example, automation systems and methods that make depalletization processes safer and more efficient are described. In some examples, a rotary lift table is used to automatically position a pallet load of boxes in an ergonomic position where a worker can readily transfer the boxes from the pallet to another location, such as a conveyor or another pallet. In some examples, a work cell for a worker includes two of the rotary lift tables that function in that manner.

14 Claims, 11 Drawing Sheets

(58) Field of Classification Search
CPC .............. B65G 2814/031; B65G 59/02; B65G 59/026; B65G 2203/0283; B65G 59/045; B65G 59/08; B65G 61/00
See application file for complete search history.

(56) References Cited

U.S. PATENT DOCUMENTS

| | | | |
|---|---|---|---|
| 8,814,492 B2 | 8/2014 | Perl | |
| 2012/0163953 A1* | 6/2012 | Murano | B25J 19/06 414/788.1 |
| 2016/0039619 A1* | 2/2016 | Wargo | B66F 7/0666 414/640 |
| 2019/0071267 A1* | 3/2019 | Otsuru | B25J 15/0616 |

OTHER PUBLICATIONS

MORN Lift [online], "MORN Rotary Round Platform Scissor Lift," Posted Feb. 29, 2020, retrieved on Oct. 5, 2021, <https://www.youtube.com/watch?v=E97O239ATZ8>, 2 page [Video Submission].

OKO TV [online],"[ OKO ] Auto Height Adjustment table lift OKO," Posted Dec. 6, 2018, retrieved on Oct. 5, 2021, <https://www.youtube.com/watch?v=A1MrMfbyVhw>, 2 page [Video Submission].

\* cited by examiner

DEPALLETIZATION SYSTEMS AND METHODS

CROSS-REFERENCE TO RELATED APPLICATIONS

This application claims the benefit of U.S. Provisional Application Ser. No. 63/088,374, filed Oct. 6, 2020. The disclosure of the prior application is considered part of (and is incorporated by reference in) the disclosure of this application.

TECHNICAL FIELD

This document relates to systems and methods for enhancing warehouse material handling operations. For example, this document relates to automation systems and methods that make depalletization processes more safe and efficient.

BACKGROUND

In 2019, worldwide ecommerce sales topped $3.5 trillion USD, an increase of about 18% from the prior year. Online sales in 2019 were 14.1% of the total global retail sales. Ecommerce sales is expected to continue growing rapidly. It is anticipated that by 2024 about one-quarter of all retail sales will be via ecommerce.

The use of warehouse automation is one way to increase the efficiency of ecommerce and order fulfillment processes generally. The goals of warehouse automation include the efficient use of space resources, and the elimination of manual steps of the order fulfillment process and to optimize the efficiency of order fulfillment processes. Warehouse automation technology is useful for multiple reasons, such as, to make material handling processes more efficient, to improve worker safety by mitigating ergonomic risks, and to help reduce the occurrences of human error.

SUMMARY

This document describes systems and methods for enhancing warehouse material handling operations. For example, this document describes automation systems and methods that make depalletization processes more safe and efficient. In some examples, a rotary lift table is used to automatically position a pallet load of boxes in an ergonomic position where a worker can readily transfer the boxes from the pallet to another location, such as to a conveyor or to another pallet. In some examples, a work cell for a worker includes two of the rotary lift tables that function in that manner.

In one aspect, this disclosure is directed to a system for depalletization that includes a rotary lift table, a sensor system, and a control system. The rotary lift table includes a platform configured to receive a pallet loaded with boxes arranged in layers with each layer of the layers including multiple boxes, a first actuator arranged to rotate the platform, and a second actuator arranged to raise and lower the platform. The sensor system is arranged and operable to detect: (i) a first state in which some, but not all, boxes of a top layer of the multiple layers have been removed and (ii) a second state in which all of the boxes of the top layer of the multiple layers have been removed. The control system is in electrical communication with the first actuator, the second actuator, and the sensor system. The control system is configured to: (i) initiate an actuation of the first actuator to rotate the platform when the sensor system detects the first state, and (ii) initiate an actuation of the second actuator to raise the platform when the sensor system detects the second state.

Such a depalletization system may optionally include one or more of the following features. The sensor system may include a first sensor that can detect a presence of one or more boxes, a second sensor that can detect a presence of one or more boxes, and a third sensor that can detect a presence of one or more boxes. In some embodiments, in the first state: (i) at least one of the first sensor, the second sensor, or the third sensor detects the presence of one or more boxes and (ii) at least one of the first sensor, the second sensor, or the third sensor does not detect the presence of one or more boxes. In particular embodiments, in the second state, each of the first sensor, the second sensor, and the third sensor do not detect the presence of one or more boxes. The actuation of the first actuator may rotate the platform 90 degrees. The actuation of the first actuator may rotate the platform 180 degrees. The actuation of the second actuator may raise the platform by a distance that is a height of the top layer. The depalletization system may also include a safety sensor that, when activated, results in inoperability of the first and second actuators. The depalletization system may also include a lift assist device configured and operable for moving the boxes, individually, from the pallet. In some embodiments, the control system is configured to automatically initiate an actuation of the second actuator to lower the platform when all of the boxes on the pallet have been removed from the pallet.

In another aspect, this disclosure is directed to a method for depalletization that includes actuating, by a control system of a depalletization system, a first actuator of a rotary lift table of the depalletization system. The actuating the first actuator rotates a platform of the rotary lift table and is initiated by the control system in response to receiving a first pattern of signals from a sensor system of the depalletization system. The method for depalletization also includes actuating, by the control system, a second actuator of the rotary lift table of the depalletization system. The actuating the second actuator raises the platform of the rotary lift table and is initiated by the control system in response to receiving a second pattern of signals from the sensor system.

Such a method for depalletization may optionally include one or more of the following features. The sensor system may include at least two sensors. The least two sensors may include a first sensor and a second sensor. The first pattern of signals may comprise: (i) no detection of a box by the first sensor and (ii) a detection of a box by the second sensor. The least two sensors may include a first sensor and a second sensor. The second pattern of signals may comprise no detection of a box by the first sensor and no detection of a box by the second sensor. In some embodiments, the actuating the first actuator rotates the platform of the rotary lift table by 90 degrees. In some embodiments, the actuating the first actuator rotates the platform of the rotary lift table by 180 degrees. The depalletization system may include a safety sensor and activation of the safety sensor results in deactivation of the first and second actuators. In some embodiments, the actuating the second actuator raises the platform of the rotary lift table until the control system receives a third pattern of signals from the sensor system. The third pattern of signals may include at least one sensor of the sensor system detecting a box. The method may also include actuating, by the control system, the second actuator to lower the platform of the rotary lift table.

The systems and processes described here may be used to provide one or more of the following optional benefits. First, worker safety enhancements are provided by the systems and processes described herein. The need for lifting is reduced. In addition, the manual tasks that workers need to perform for depalletization or pallet down-stacking are made more ergonomic by the systems and processes described herein.

Second, labor costs associated with depalletization processes can be reduced using the automated systems and processes described herein. Productivity is improved. That is, each worker can handle more boxes per hour using the systems and processes described herein.

Third, in some cases warehouse space requirements can be reduced using the automated systems and processes described herein.

Other features, aspects and potential advantages will be apparent from the accompanying description and figures.

DESCRIPTION OF DRAWINGS

Like reference symbols in the various drawings indicate like elements

DETAILED DESCRIPTION

This document describes systems and methods for enhancing warehouse material handling operations. For example, this document describes automation systems and methods that make depalletization processes more safe and efficient. In some examples, a rotary lift table is used to automatically position a pallet load of boxes in an ergonomic position where a worker can readily transfer the boxes from the pallet to another location, such as to a conveyor or to another pallet. In some examples, a work cell for a depalletization worker includes two of the rotary lift tables that function in that manner. In some embodiments, the rotary lift table is part of a depalletization system that also includes sensors and a control system. The sensors and control system work in concert, as described herein, to determine appropriate times to actuate motions of the rotary lift table such as platform rotation and/or platform raising and lowering.

Figure 1:
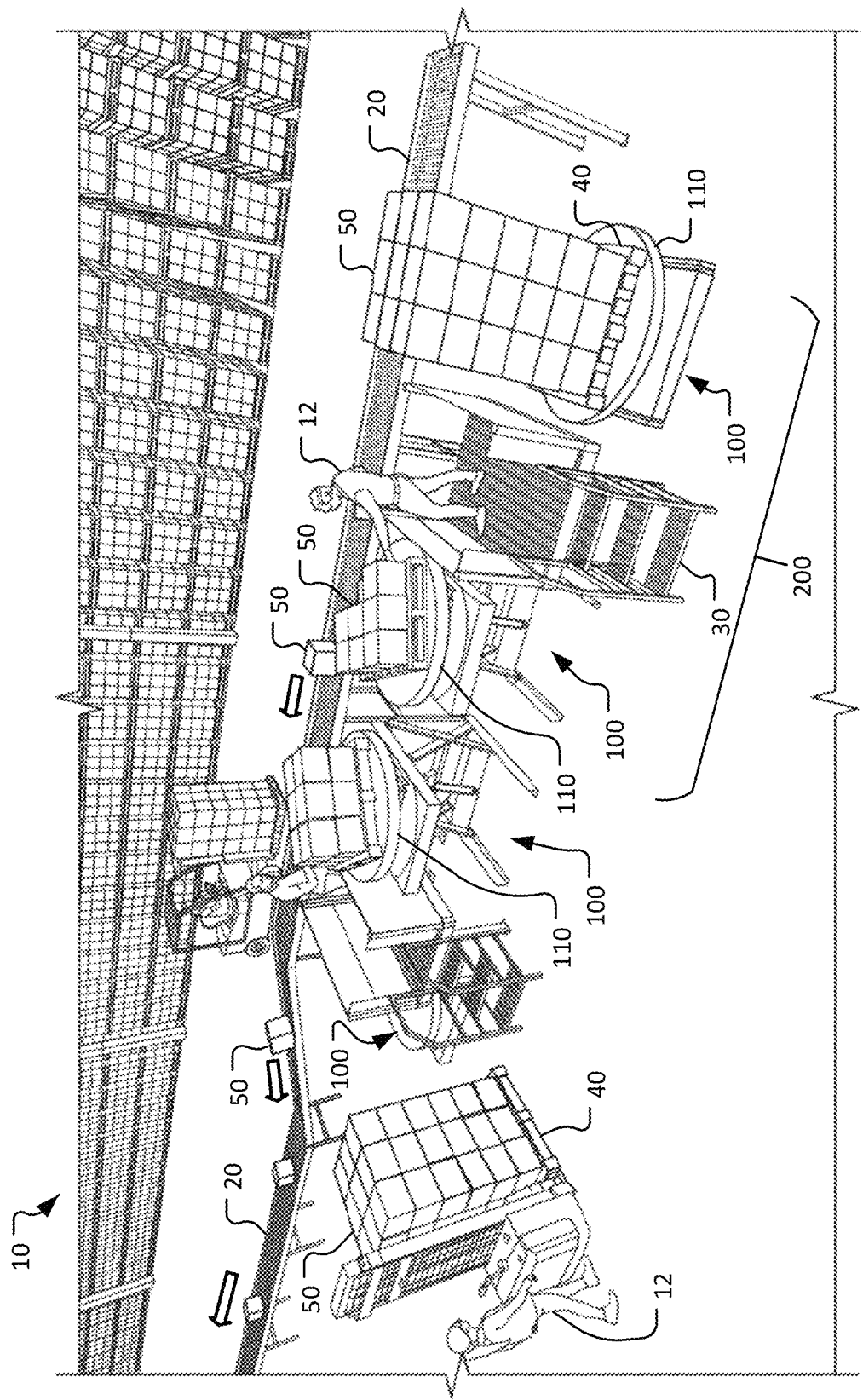
FIG. 1 depicts an example warehouse depalletization operation in accordance with some embodiments.

FIG. 1 depicts an example warehouse depalletization operation 10. The purpose of this warehouse depalletization operation 10 is to transfer boxes 50 from pallets 40 to a conveyor 20. In this example, the conveyor 20 is transporting the individual boxes 50 from right to left (as indicated by the arrows) after a worker 12 has transferred an individual box 50 from a pallet 40 to the conveyor 20.

Pallet loads (multiple boxes 50 stacked on a pallet 40) are transported to the warehouse depalletization operation 10 for depalletization. The pallet loads are placed onto a rotary lift table 110 of a depalletization system 100. A worker 12 physically moves the boxes 50, one at a time, from the pallet 40 to the conveyor 20

The depalletization system 100 functions to make the physical work performed by the worker 12 less strenuous and more ergonomically-friendly in at least the following manners.

First, it should be observed that the pallet loads have multiple boxes 50 arranged in multiple layers on the pallet 40. That is, each layer of boxes 50 includes multiple boxes 50, and there are multiple layers of the boxes 50 on the pallet 40.

The depalletization system 100 raises and lowers the pallet load so that the top layer of boxes 50 is at about the same elevation as the conveyor 20. That way, the worker 12 can transfer the boxes 50 from the top layer of boxes 50 to the conveyor 20 without much, if any, lifting of the boxes 50. Hence, the depalletization process is less physically strenuous for the worker 12, and the ergonomics of the depalletization process are enhanced.

When all of the boxes 50 of the top layer have been transferred to the conveyor 20, the depalletization system 100 can automatically raise the pallet load so that the new top layer of the boxes 50 becomes at about the same elevation as the conveyor 20. Then, the worker 12 can proceed with transferring the boxes 50 of the new top layer to the conveyor 20. This process can repeat until all of the boxes 50 have been transferred from the pallet 40 to the conveyor 20. While in some embodiments the depalletization system 100 automatically raises the pallet load, alternatively (or additionally) in some embodiments the worker 12 can raise the pallet load by manually actuating the lift actuator of the rotary lift table 110 (e.g., using a foot pedal switch, voice control, push button, or other type of switching device).

In addition, as described further below, the depalletization system 100 rotates the pallet load so that the next box 50 to be transferred by the worker 12 to the conveyor 20 is positioned close to the worker 12 (e.g., close to an elevated platform 30 that the worker 12 can stand on close to the boxes 50). Because of that, the requirements for the worker 12 to reach to boxes 50 on the far side of the pallet 40 is reduced. Hence, for this additional reason, the depalletization process is less physically strenuous for the worker 12, and the ergonomics of the depalletization process are enhanced in this manner.

From the above description, it can be envisioned that the rotary lift table 110 includes a first actuator that can rotate the platform of the rotary lift table 110 and a second actuator that can raise and lower the platform of the rotary lift table 110. The actuators can be any suitable type of actuator such as electric, hydraulic, air operated, etc., and combinations thereof.

In some embodiments, the depalletization system 100 includes a lift assist device (not shown) that the worker 12 can use to transfer boxes 50 from the pallet 40 to the conveyor 20. For example, in some embodiments the lift assist device can be a zero-gravity lift device with a suction cup or clamp device that can engage with one or more boxes 50 at a time.

In some embodiments, the depalletization system 100 includes a safety device/system (not shown) situated between the elevated platform 30 and the pallet load on the lift table 110. Such a safety device/system can operate to mitigate safety risks of the worker 12 getting pinched between the elevated platform 30 and the pallet load on the lift table 110, especially as the pallet load rotates. The safety device/system can be various types of arrangements such as, but not limited to, one or more micro-switches that are actuated by a pivotable plate, a light curtain, an ultrasonic sensor system, a safety cable, a touch strip sensor, and the like. When the safety device/system is tripped, the motions of the rotary lift table 110 can be immediately ceased in response.

Still referring to FIG. 1, it can be seen that the elevated platform 30 is located between two of the depalletization systems 100. This combination creates a depalletization work cell 200. FIG. 1 shows two of the depalletization work cells 200 (only one of which is labeled as 200). One purpose of this design/layout is that when the worker 12 fully transfers all of the boxes 50 from the pallet 40 on a first depalletization system 100 in the depalletization work cell 200, then the worker 12 can immediately turn around and start working on transferring the boxes 50 from the pallet 40 on a second depalletization system 100 in the depalletization work cell 200. While the worker 12 is working with the second depalletization system 100, another worker 12 operating a fork lift, for example, can remove the empty pallet 40 from the first depalletization system 100 and then place another full pallet load of boxes 50 on the first depalletization system 100. Accordingly, the worker 12 performing the depalletization in the depalletization work cell 200 has very little idle time waiting for more incoming pallet loads of boxes 50 to be transferred to the conveyor 20.

Figure 2:
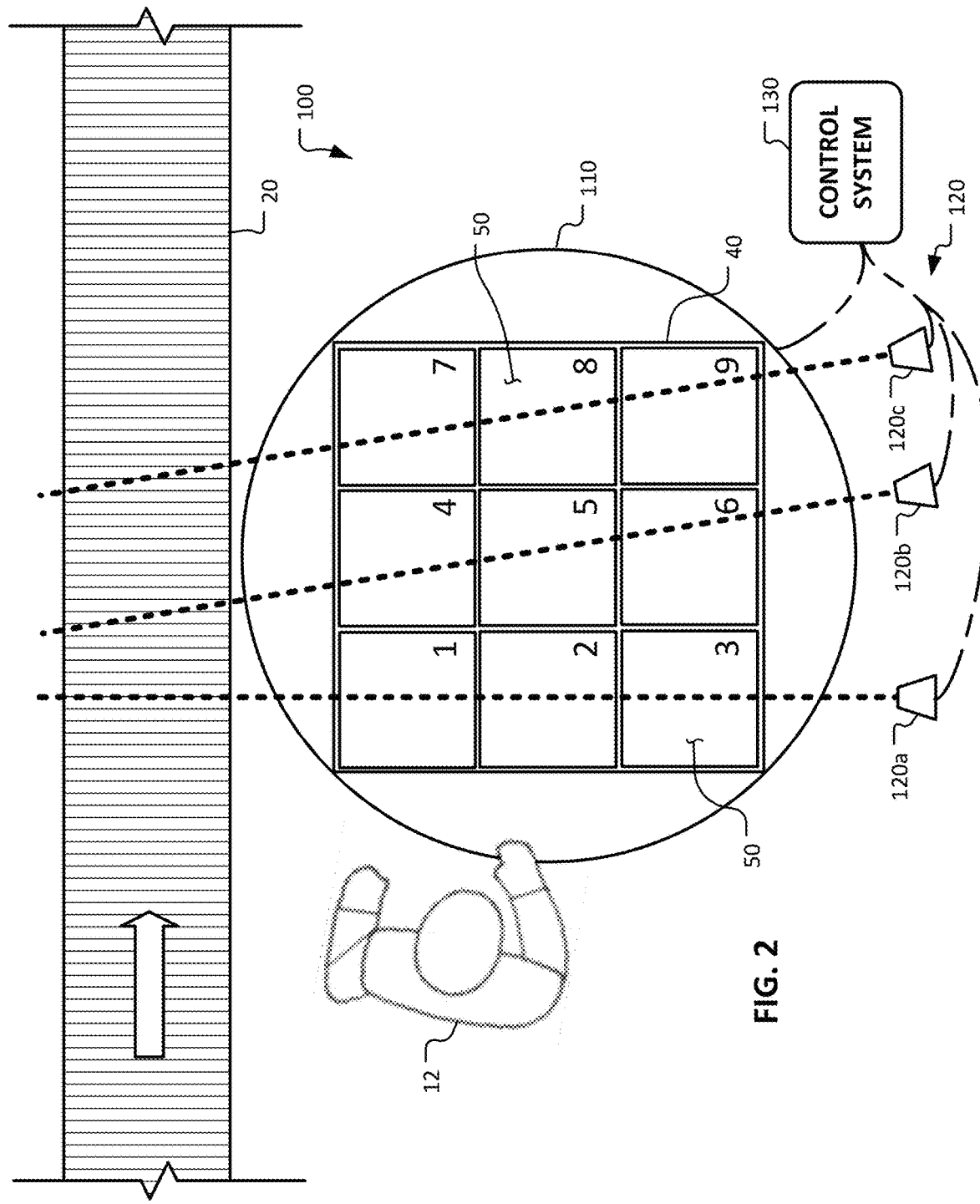
FIG. 2 is a schematic top view of an example depalletization system that can be used as part of the warehouse depalletization operation of FIG. 1.

FIG. 2 shows a top view of the depalletization system 100, the conveyor 20, and the worker 12. As described above, the worker 12 is tasked with transferring boxes 50 from the pallet 40 located on the rotary lift table 110 to the conveyor 20. In this example, the conveyor 20 transports the boxes 50 from left to right (as indicated by the arrow on the conveyor 20).

In FIG. 2, additional components of the depalletization system 100 are shown that were not explicitly described above in regard to FIG. 1. In particular, the depalletization system 100 includes a sensor system 120, and a control system 130 (in addition to the rotary lift table 110 as described above). The control system 130 is in electrical communication with the rotary lift table 110 (e.g., with the first actuator that rotates the platform of the rotary lift table 110 and the second actuator that raises and lowers the platform of the rotary lift table 110) and the sensor system 120.

The control system 130 can include one or more programmable computer processors with accessible memory, or simply relay logic in some embodiments. The control system 130 can broadly include and encompass multiple components such as, but not limited to, a programmable logic controller (PLC), relays, motor drives, and various other input and output devices.

In the depicted embodiment, the sensor system 120 includes a first sensor 120a, a second sensor 120b, and a third sensor 120c (or collectively "sensors 120a-c"). The sensors 120a-c can be various types of sensors. For example, the sensors 120a-c can be photo optic sensors. The photo optic sensors can be a through-beam design, a reflective design, a diffuse design, or combinations thereof. In some embodiments, the sensors 120a-c can be ultrasonic proximity sensors. In some embodiments, the sensors 120a-c can be video sensors (e.g., one or more cameras used in conjunction with image-analysis software). In some embodiments, multiple different types of sensor technologies can be used to comprise the sensor system 120. While in the depicted embodiment the sensor system 120 includes the three sensors (the first sensor 120a, the second sensor 120b, and the third sensor 120c), in some embodiments one, two, or more than three sensors are included as part of the sensor system 120.

In FIG. 2, we can see only the top layer of boxes 50 on the pallet 40. Of course, there are additional layers of boxes 50 below the top layer that are not visible here. In this non-limiting example, the top layer of boxes 50 includes nine (9) boxes 50. The boxes 50 are numbered "1" through "9" so that each of the boxes 50 can be individually traced in the following FIGS. 2-10 that show a sequence of steps for transferring the top layer of boxes 50 to the conveyor 20.

The first step that the worker 12 will do is to transfer box 1 to the conveyor 20. This is performed relatively easily because the top layer of the boxes 50 (which includes boxes 1-9) is elevated to approximately the same elevation as the conveyor 20. Hence, little, if any, lifting of the boxes 50 is required by the worker 12 as the worker 12 transfers the boxes 50 from the pallet 40 to the conveyor 20. In some embodiments, when a full pallet load of boxes 50 is placed onto the rotary lift table 110, the control system 130 can actuate the second actuator of the rotary lift table 110 to raise the pallet 40 to the proper level so that the top layer of the boxes 50 is elevated to approximately the same elevation as the conveyor 20. The sensor system 120 can serve to provide signals to the control system 130 to indicate when the top layer of the boxes 50 is elevated to approximately the same elevation as the conveyor 20. Then, the control system 130 can stop the actuation of the second actuator of the rotary lift table 110. In some embodiments, the worker 12 can manually actuate a switch (e.g., foot pedal, etc.) to raise the rotary lift table 110 so that the top layer of the boxes 50 is elevated to approximately the same elevation as the conveyor 20.

After transferring box 1 to the conveyor 20, then the worker 12 will then transfer box 2 to the conveyor 20. After that, the worker 12 will transfer box 3 to the conveyor 20. In each case, the worker 12 can primarily slide the boxes 50 rather than lift the boxes 50. When boxes 1, 2, and 3 have been transferred to the conveyor 20, the arrangement will look like what is shown in FIG. 3.

Figure 3:
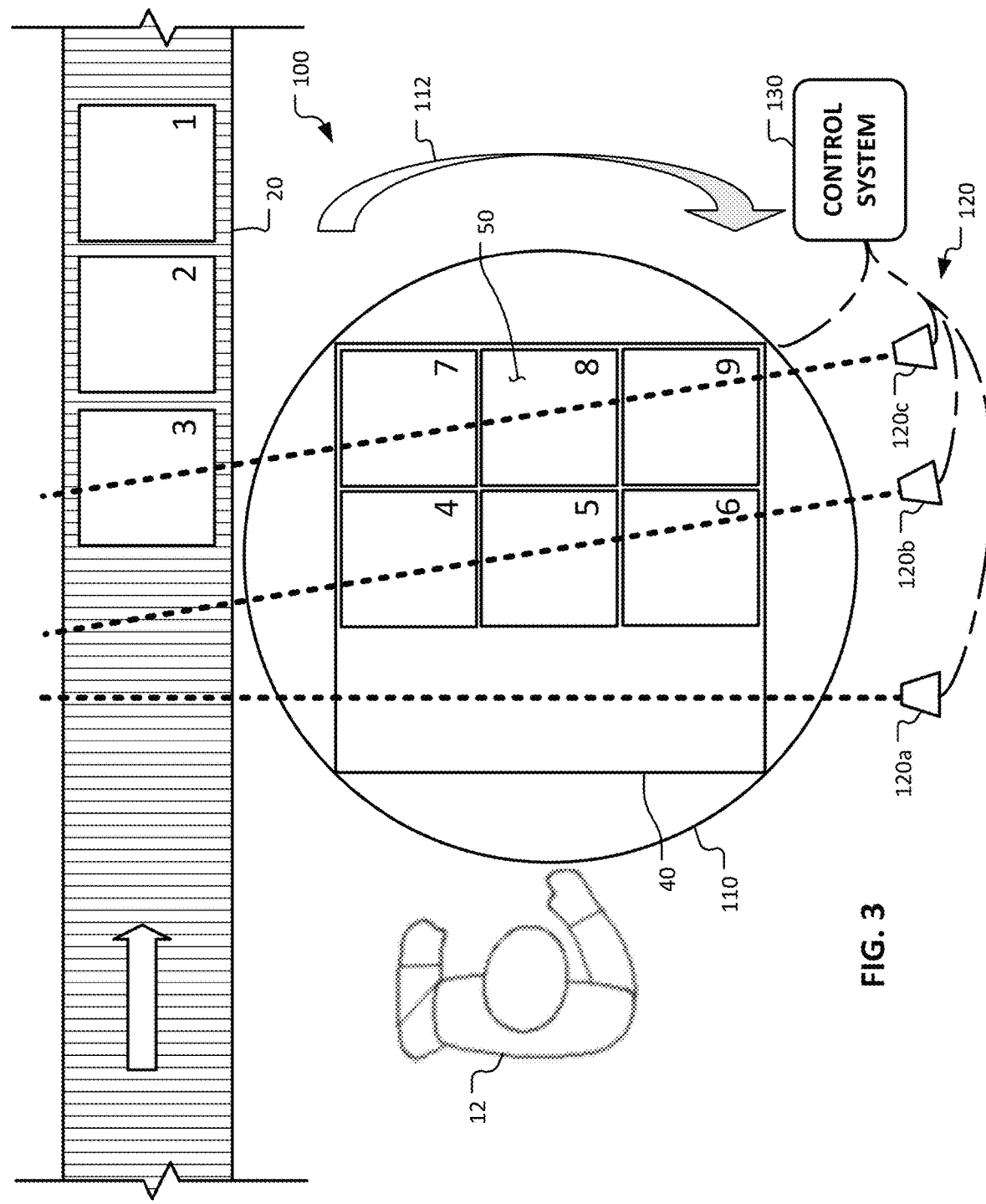
FIGS. 3-10 are additional schematic top views of the example depalletization system of FIG. 2. These figures illustrate a sequence of arrangements of the depalletization system as a worker is transferring the individual boxes of a layer of boxes from a pallet load to a conveyor.

As shown in FIG. 3, with boxes 1, 2, and 3 now on the conveyor 20, the first sensor 120a will detect that the area close to the worker 12 does not include any boxes 50. However, the sensors 120b and 120c will detect the presence of at least one box 50. In that case, the control system 130, in response to receiving such a pattern of signals from the sensors 120, will actuate the first actuator of the rotary lift table 110 to cause the platform of the rotary lift table 110 to rotate (e.g., as indicated by the arrow 112).

While the rotation of the rotary lift table 110 is indicated here as being clockwise, in some embodiments the rotation of the rotary lift table 110 is counterclockwise.

Figure 4:
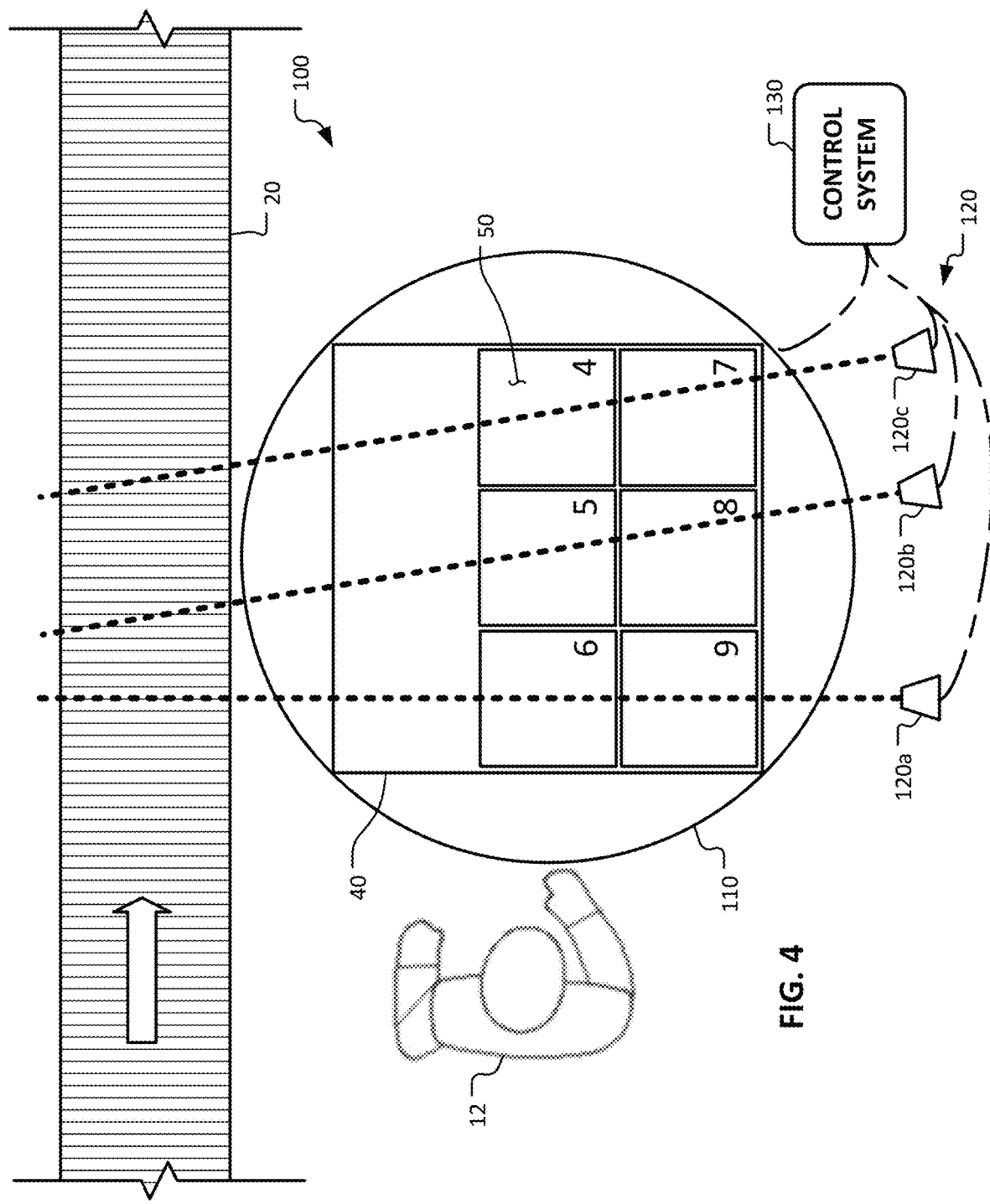

FIG. 4 shows the depalletization system 100 after an incremental 90 degree clockwise rotation of the rotary lift table 110. In some embodiments, the rotary lift table 110 rotates in increments of 180 degrees rather than the 90 degree rotation as depicted in this example. In this arrangement, as a result of the 90 degree rotation, box 6 and box 9 are now in the area close to the worker 12.

The next step by the worker 12 is to transfer box 6 to the conveyor 20. After that, the worker 12 will transfer box 9 to the conveyor 20. When those actions have been completed, the arrangement of the depalletization system 100 will look like FIG. 5.

Figure 5:
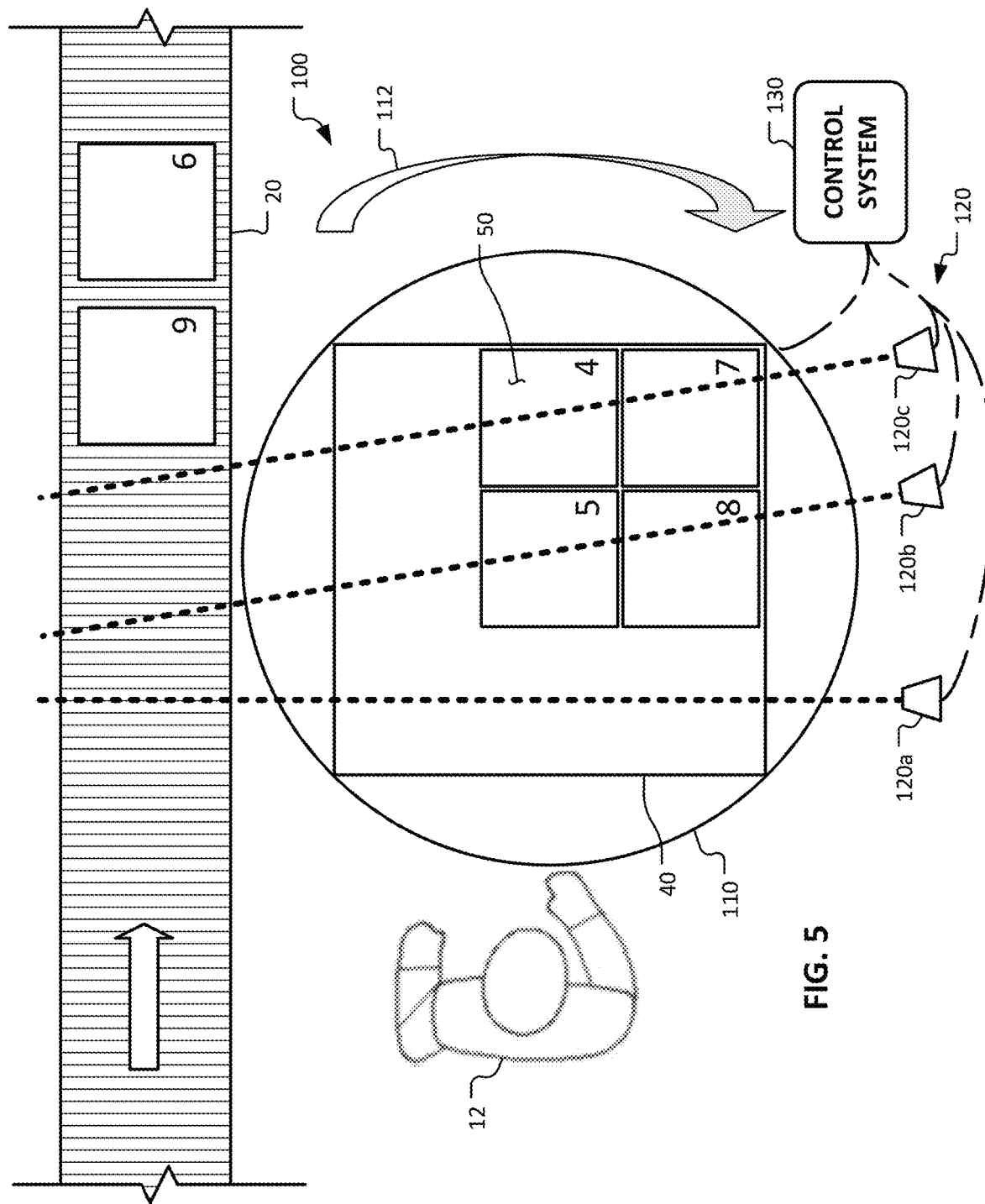

In the arrangement depicted in FIG. 5, with boxes 6 and 9 now on the conveyor 20, the first sensor 120a will once again detect that the area close to the worker 12 does not include any boxes 50. However, the sensors 120b and 120c will still detect the presence of at least one box 50. In that case, the control system 130, in response to receiving such a pattern of signals from the sensors 120, will actuate the first actuator of the rotary lift table 110 to cause the platform of the rotary lift table 110 to rotate again (e.g., as indicated by the arrow 112).

Figure 6:
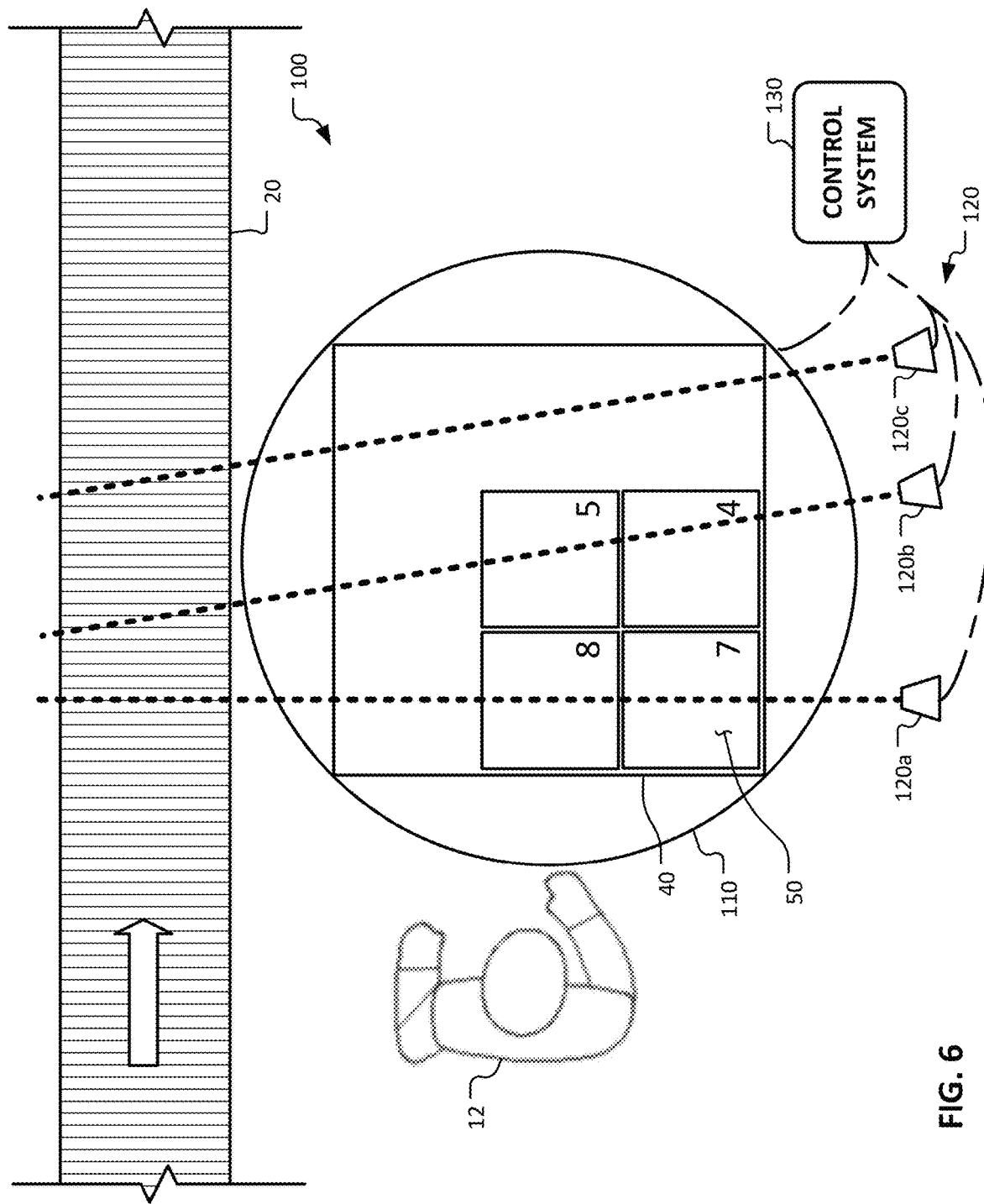

FIG. 6 shows the depalletization system 100 after a second incremental 90 degree clockwise rotation of the rotary lift table 110. Boxes 8 and 7 are now in the area close to the worker 12. Accordingly, the worker 12 can now readily transfer box 8, and then box 7, to the conveyor 20. When those tasks are completed, the arrangement of the depalletization system 100 will look like FIG. 7.

Figure 7:
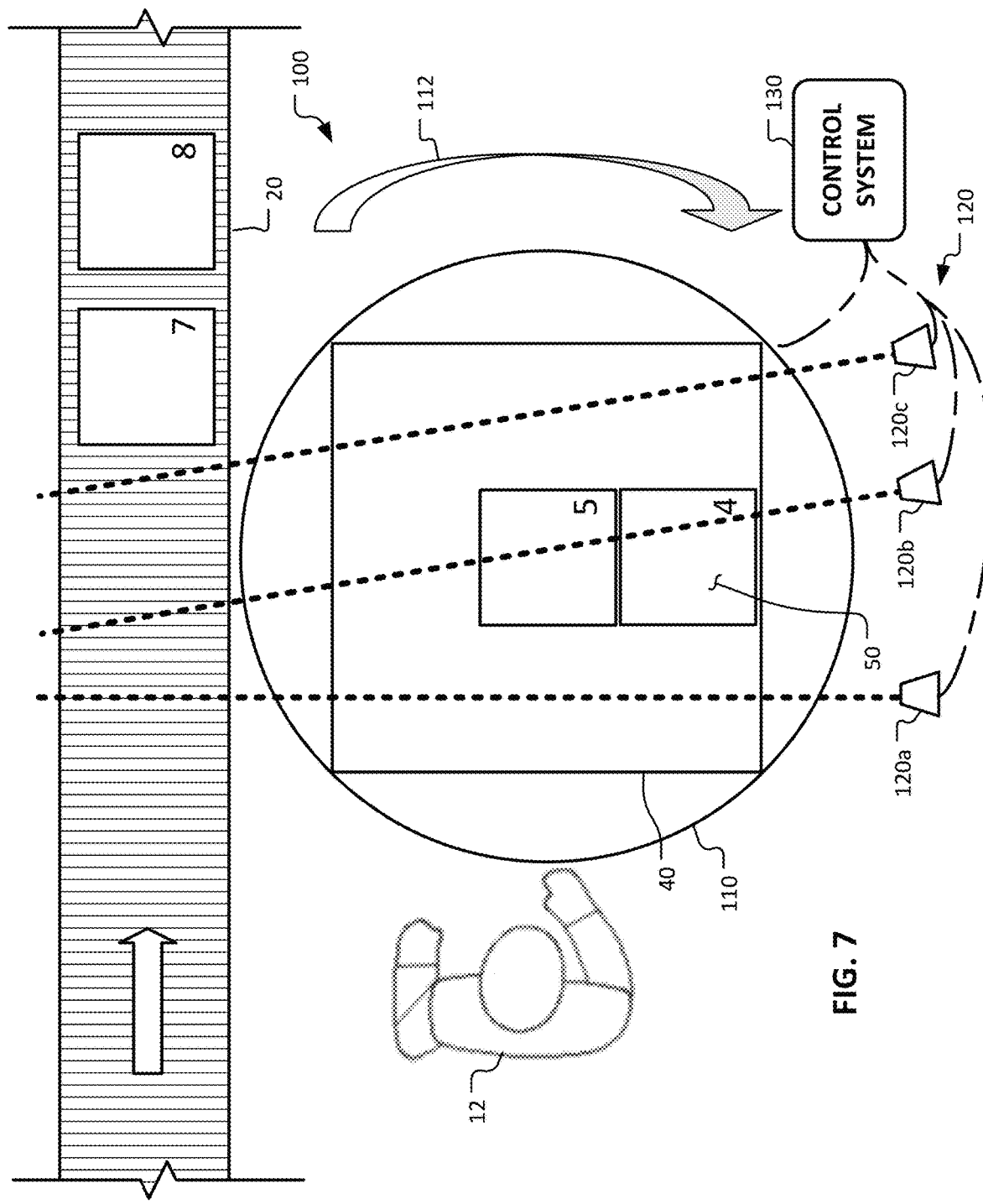

In the arrangement depicted in FIG. 7, with boxes 8 and 7 now on the conveyor 20, the first sensor 120a will once again detect that the area close to the worker 12 does not include any boxes 50. However, the sensors 120b and 120c will still detect the presence of at least one box 50. In that case, the control system 130, in response to receiving such a pattern of signals from the sensors 120, will actuate the first actuator of the rotary lift table 110 to cause the platform of the rotary lift table 110 to rotate again (e.g., as indicated by the arrow 112).

Figure 8:
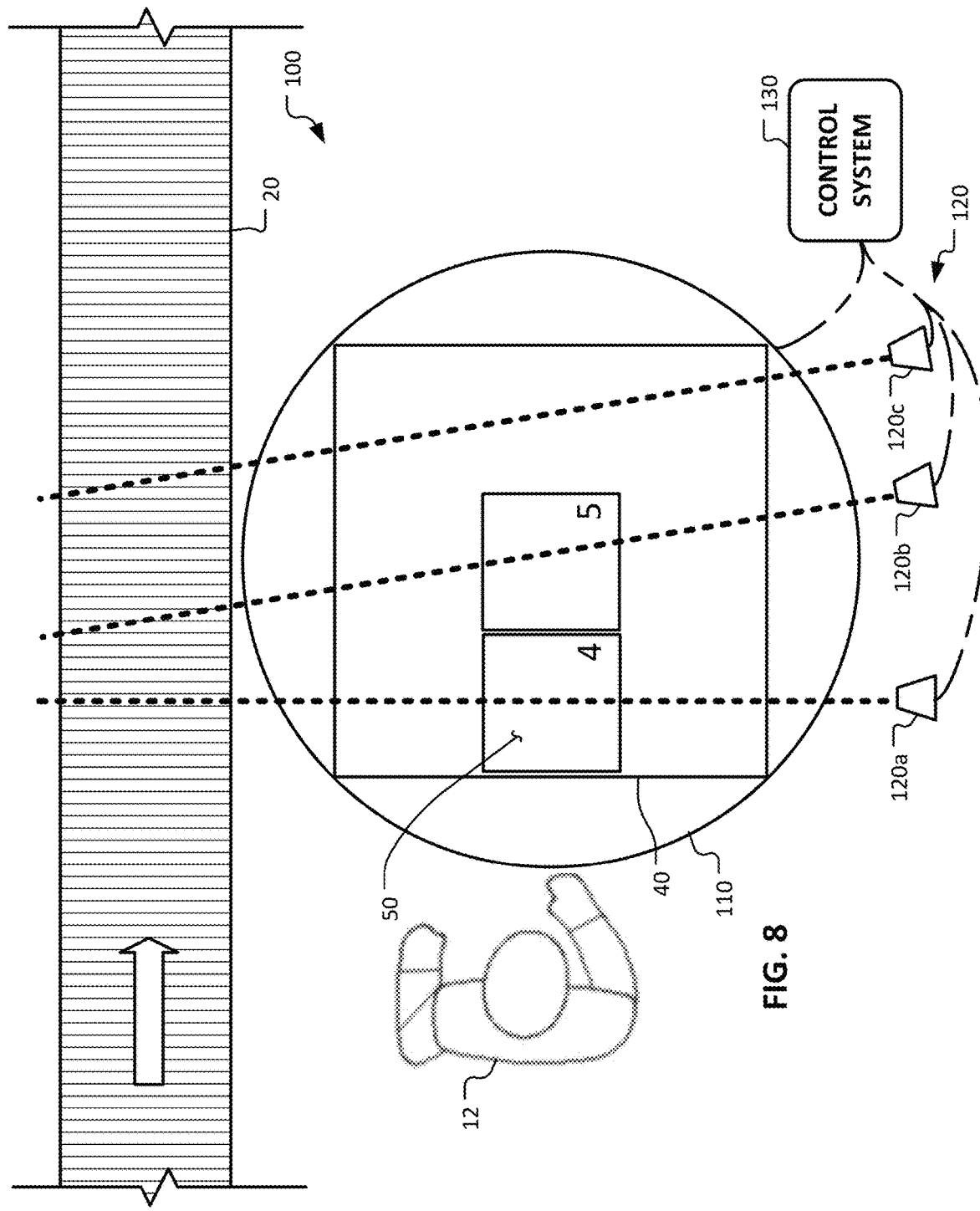

FIG. 8 shows the depalletization system 100 after a third incremental 90 degree clockwise rotation of the rotary lift table 110. Box 4 is now in the area close to the worker 12. Accordingly, the worker 12 can now readily transfer box 4 to the conveyor 20. After that, the worker 12 can slide the center box 5 closer to the worker 12 and then readily transfer box 5 to the conveyor 20. When those tasks are completed, the arrangement of the depalletization system 100 will look like FIG. 9.

Figure 9:
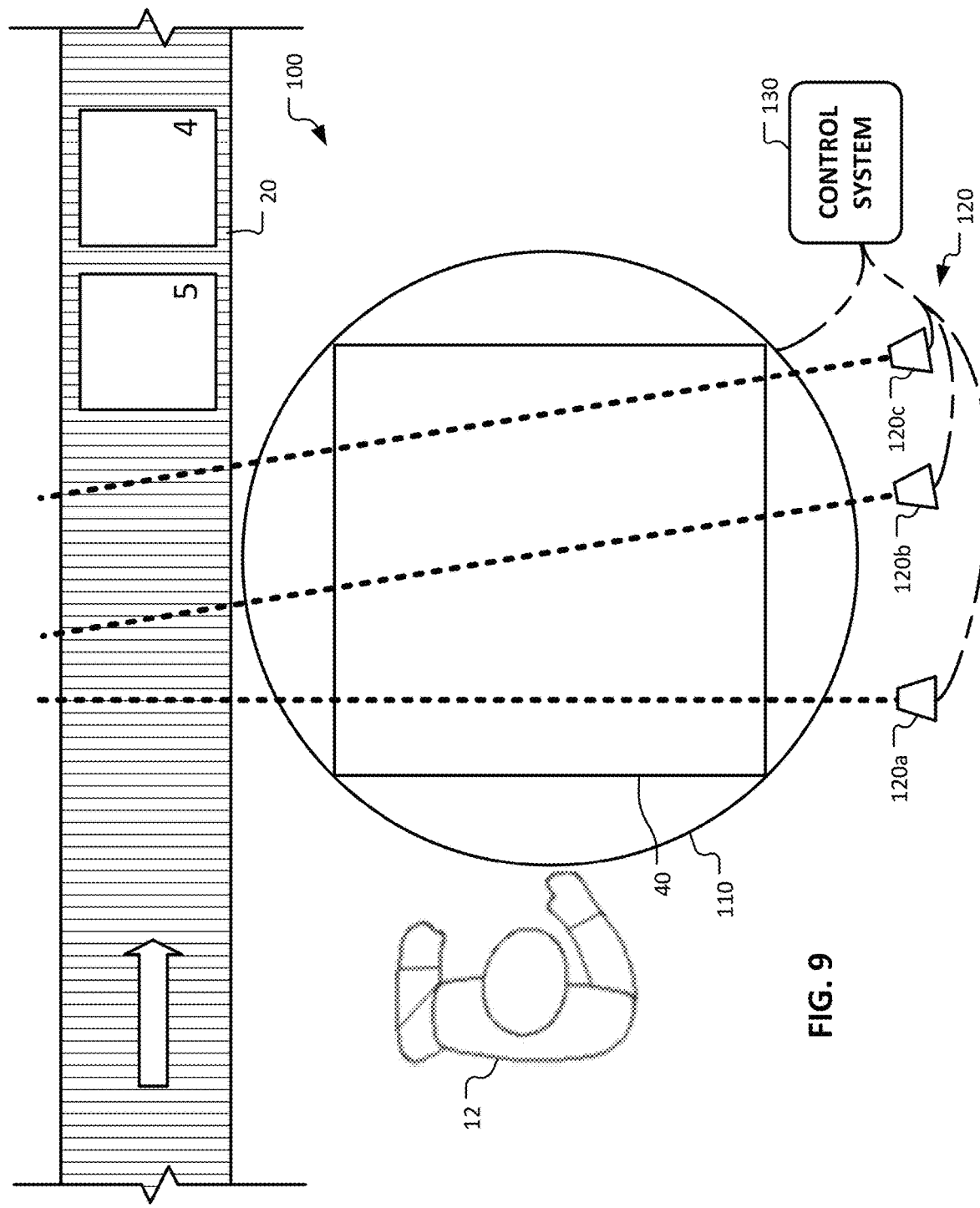

In the arrangement depicted in FIG. 9, with boxes 4 and 5 now on the conveyor 20, the first sensor 120a will once again detect that the area close to the worker 12 does not include any boxes 50. In addition, the sensors 120b and 120c will also not detect any boxes 50. In that case, the control system 130, in response to receiving such a pattern of signals from the sensors 120, will actuate the second actuator of the rotary lift table 110 to cause the platform of the rotary lift table 110 to raise so that the next layer of boxes 50 is at approximately the same elevation as the conveyor 20. As the platform of the rotary lift table 110 is raising, the sensor system 120 can serve to provide signals to the control system 130 to indicate when the new top layer of the boxes 50 is elevated to approximately the same elevation as the conveyor 20. Then, the control system 130 can stop the actuation of the second actuator of the rotary lift table 110. In some embodiments, the worker 12 can manually actuate a switch (e.g., foot pedal, etc.) to raise the rotary lift table 110 so that the top layer of the boxes 50 is elevated to approximately the same elevation as the conveyor 20.

Figure 10:
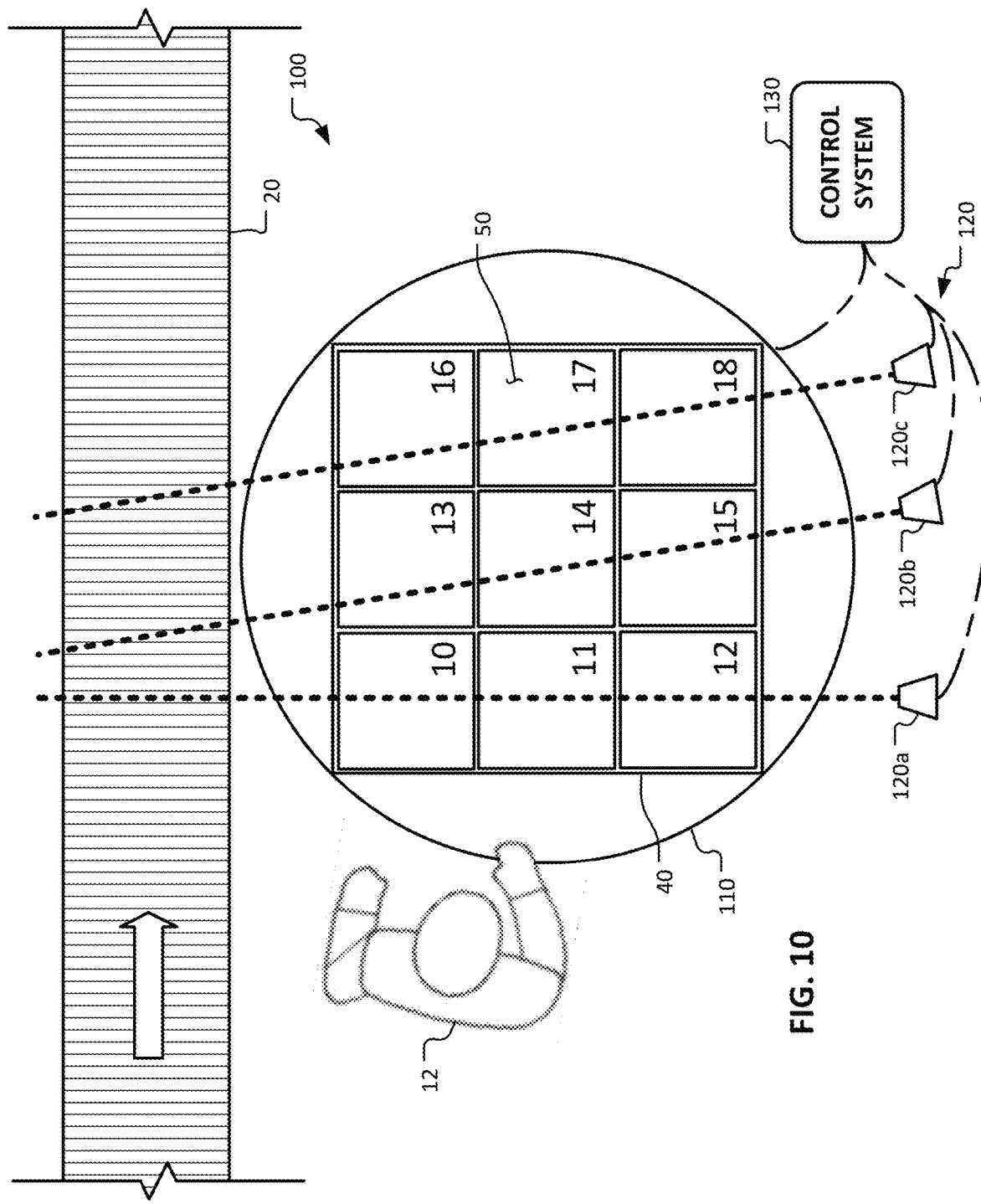

FIG. 10 shows the depalletization system 100 after the platform of the rotary lift table 110 has raised to the extent that the new top layer of boxes 50 is approximately at the same elevation as the conveyor 20. Boxes 10-18 are included in the new top layer of boxes 50. Boxes 10-12 are now in the area close to the worker 12. Accordingly, the worker 12 will proceed to move boxes 10-12 onto the conveyor 20 in the same manner as the boxes 1-3 described in relation to FIG. 2. The entire new top layer of boxes 50 can be transferred to the conveyor 20 in the same manner as described in FIGS. 2-9. This repetitive process can proceed until all of the boxes 50 have been removed from the pallet 40. Then, the control system 130 can actuate the second actuator to lower the platform of the rotary lift table 110 all the way to its lower limit. There, the pallet 40 can be removed and a new pallet load can be positioned on the rotary lift table 110 in preparation for another depalletization cycle.

While the above description of FIGS. 2-10 includes the incremental rotation of the platform of the rotary lift table 110 (by either 90 degrees or 180 degrees), in some embodiments the depalletization system 100 slowly rotates on a continuous basis. When the speed of rotation is appropriately matched to the speed of the depalletization by the worker 12, the continuous rotation of the platform of the rotary lift table 110 can be beneficial from a productivity standpoint. In some embodiments, a manual speed adjustment device is provided so that the worker 12 can increase and decrease the speed of the continuous rotation of the platform of the rotary lift table 110 as desired.

Figure 11:
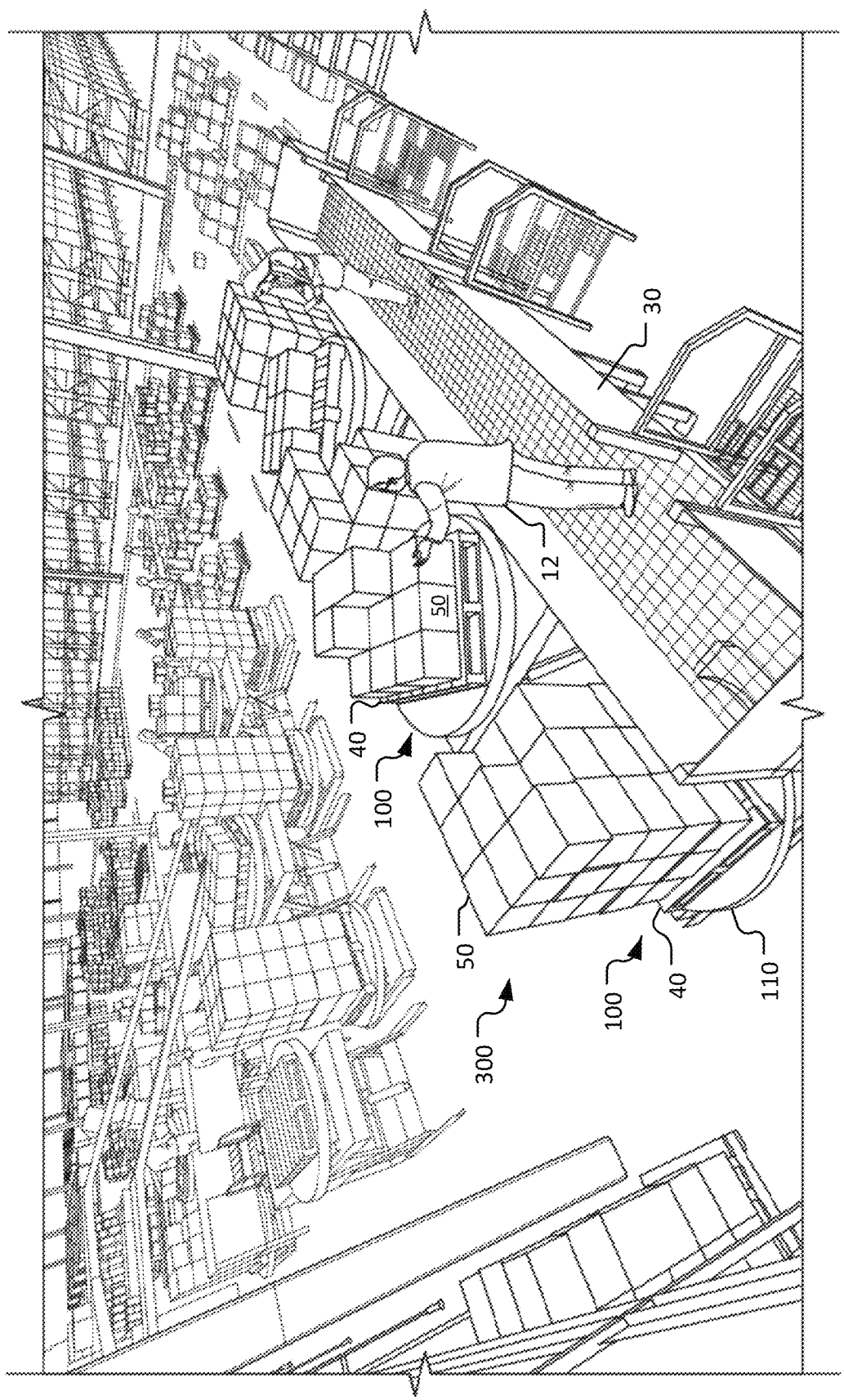
FIG. 11 depicts an example warehouse pallet down-stacking operation in accordance with some embodiments.

FIG. 11 depicts an example warehouse pallet down-stacking operation 300. The purpose of this pallet down-stacking operation 300 is to transfer some boxes 50 from full pallets 40 to other, previously empty pallets 40 to create multiple pallets 40 that include fewer boxes 50 than the full pallet 40. For example, a pallet 40 that has six layers of boxes 50 stacked thereon may be converted to two pallets 40 that each have three layers of boxes 50. Or, a pallet 40 that has six layers of boxes 50 stacked thereon may be converted to three pallets 40 that each have two layers of boxes 50. Or, a pallet 40 that has six layers of boxes 50 stacked thereon may be converted to six pallets 40 that each have one layer of boxes 50. These, of course, are non-limiting examples.

In the depicted example, the pallet down-stacking operation 300 includes two of the depalletization systems 100 that are positioned adjacent (side-by-side) to each other. A worker 12 is on an elevated platform 30 right next to the two, side-by-side depalletization systems 100. Instead of transferring the boxes 50 to the conveyor 20 as described above in reference to FIGS. 1-10, here the worker 12 is transferring boxes 50 from one of the depalletization systems 100 to the other depalletization system 100. The depalletization systems 100 can work using the same operational principles as described above.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse, a trackball, or a touchscreen, etc.) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, tactile input, eye movement tracking input, a brain-computer interface, gesture input, and the like, and combinations thereof).

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described herein should not be understood as requiring such separation in all embodiments, and it should be understood that the described program components and systems can generally be integrated together in a single product or packaged into multiple products.

What is claimed is:

1. A depalletization system comprising:
    a rotary lift table comprising:
        a platform configured to receive a pallet loaded with boxes, the boxes on the pallet arranged in layers with each layer of the layers including multiple boxes;
        a first actuator arranged to rotate the platform; and
        a second actuator arranged to raise and lower the platform;
    a sensor system comprising three sensors that each have a respective line of sight directed across the platform of the rotary lift table, wherein each sensor of the three sensors is arranged and operable to detect whether any of the boxes are present along the respective line of sight, wherein a first sensor of the three sensors is arranged to detect the boxes on the pallet that are located closest to a position from which a worker unloads the boxes from the pallet, wherein a second sensor of the three sensors is arranged to detect the boxes on the pallet that are located in a middle of the pallet, and wherein a third sensor of the three sensors is arranged to detect the boxes on the pallet that are located the farthest from the position from which the worker unloads the boxes from the pallet; and
    a control system in electrical communication with the first actuator, the second actuator, and the three sensors, wherein the control system is configured to: (i) initiate an actuation of the first actuator to rotate the platform in response to a first state in which the first sensor does not detect any of the boxes and the second and third sensors each detect the boxes, and (ii) initiate an actuation of the second actuator to raise the platform in response to a second state in which each of the three sensors does not detect any of the boxes.

2. The depalletization system of claim 1, wherein the actuation of the first actuator rotates the platform 90 degrees.

3. The depalletization system of claim 1, wherein the actuation of the first actuator rotates the platform 180 degrees.

4. The depalletization system of claim 1, wherein the actuation of the second actuator raises the platform by a distance that is a height of the top layer.

5. The depalletization system of claim 1, further comprising a safety sensor that, when activated, results in inoperability of the first and second actuators.

6. The depalletization system of claim 1, further comprising a lift assist device configured and operable for moving the boxes, individually, from the pallet.

7. The depalletization system of claim 1, wherein the control system is configured to automatically initiate an actuation of the second actuator to lower the platform when all of the boxes on the pallet have been removed from the pallet.

8. A method for depalletization comprising:
    actuating, by a control system of a depalletization system, a first actuator of a rotary lift table of the depalletization system, wherein the actuating the first actuator rotates a platform of the rotary lift table and is initiated by the control system in response to receiving a first pattern of signals from a sensor system of the depalletization system, wherein the sensor system comprises three sensors that each have a respective line of sight directed across the platform of the rotary lift table, wherein each sensor of the three sensors is arranged and operable to detect whether any of the boxes are present along the respective line of sight, wherein a first sensor of the three sensors is arranged to detect the boxes on the pallet that are located closest to a position from which a worker unloads the boxes from the pallet, wherein a second sensor of the three sensors is arranged to detect the boxes on the pallet that are located in a middle of the pallet, and wherein a third sensor of the three sensors is arranged to detect the boxes on the pallet that are located the farthest from the position from which the worker unloads the boxes from the pallet, and wherein the first pattern of signals indicates: (i) a detection of the boxes by the second and third sensors, and (ii) no detection of the boxes by the first sensor; and actuating, by the control system, a second actuator of the rotary lift table of the depalletization system, wherein the actuating the second actuator raises the platform of the rotary lift table and is initiated by the control system in response to receiving a second pattern of signals that indicates each of the three sensors do not detect any of the boxes.

9. The method of claim 8, wherein the actuating the first actuator rotates the platform of the rotary lift table by 90 degrees.

10. The method of claim 8, wherein the actuating the first actuator rotates the platform of the rotary lift table by 180 degrees.

11. The method of claim 8, wherein the depalletization system includes a safety sensor and activation of the safety sensor results in deactivation of the first and second actuators.

12. The method of claim 8, wherein the actuating the second actuator raises the platform of the rotary lift table until the control system receives a third pattern of signals from the sensor system.

13. The method of claim 8, wherein the third pattern of signals comprises at least one of the three sensors of the sensor system detecting a box.

14. The method of claim 8, further comprising actuating, by the control system, the second actuator to lower the platform of the rotary lift table.

* * * * *